May 19, 1959 W. S. PRAEG ET AL 2,887,014
GEAR FINISHING MACHINE
Filed April 27, 1953 4 Sheets-Sheet 1
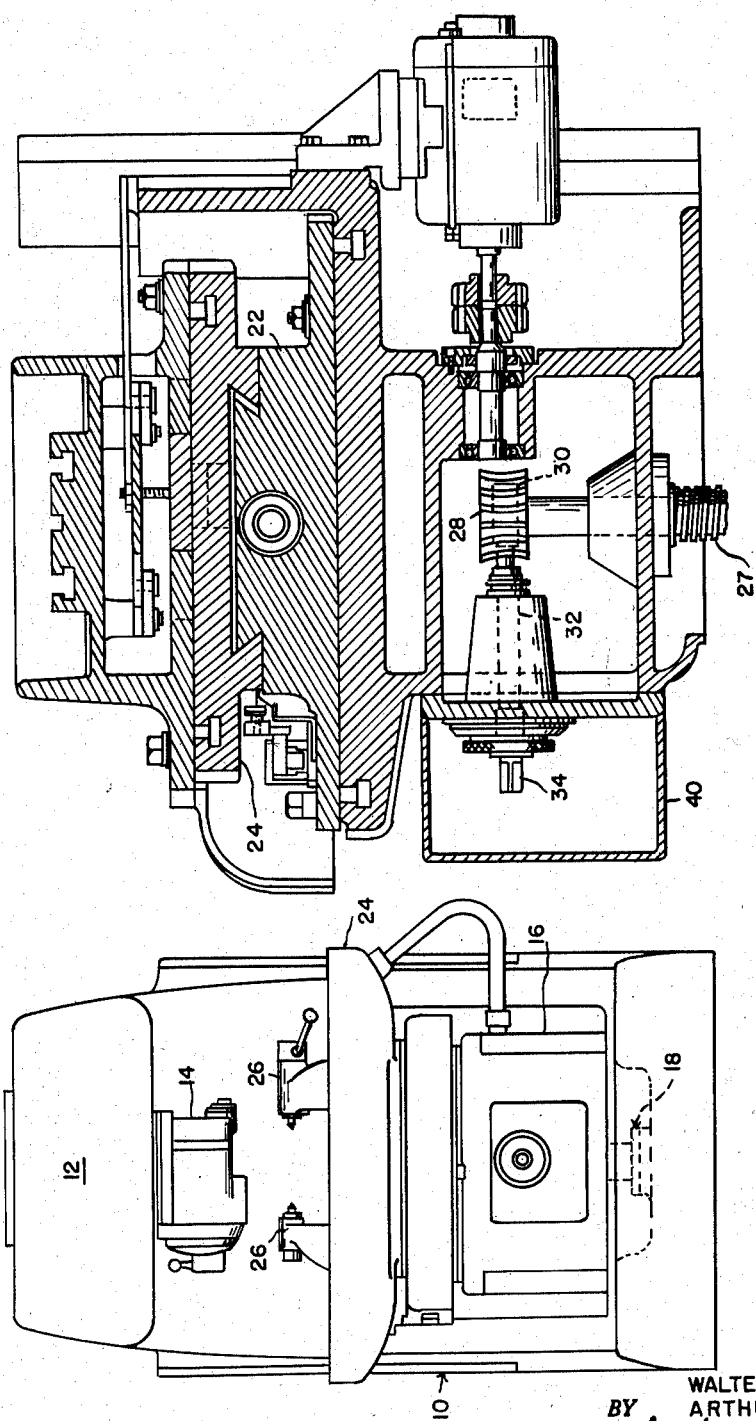
INVENTORS
WALTER S. PRAEG
BY ARTHUR B. BASSOFF
Whittemore, Hulbert
& Belknap
ATTORNEYS

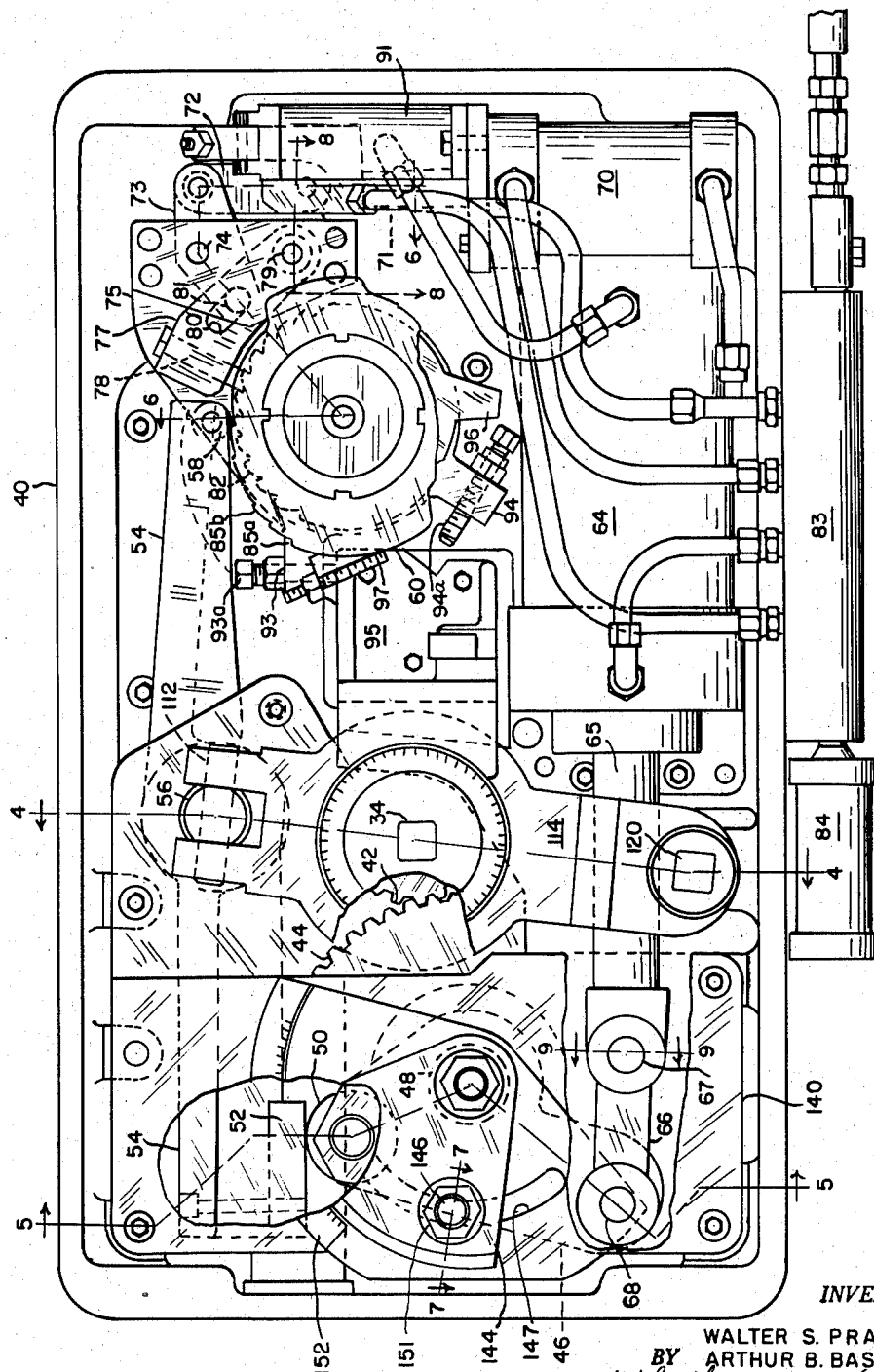

INVENTORS
WALTER S. PRAEG
BY ARTHUR B. BASSOFF
ATTORNEYS

May 19, 1959    W. S. PRAEG ET AL    2,887,014
GEAR FINISHING MACHINE
Filed April 27, 1953    4 Sheets-Sheet 4
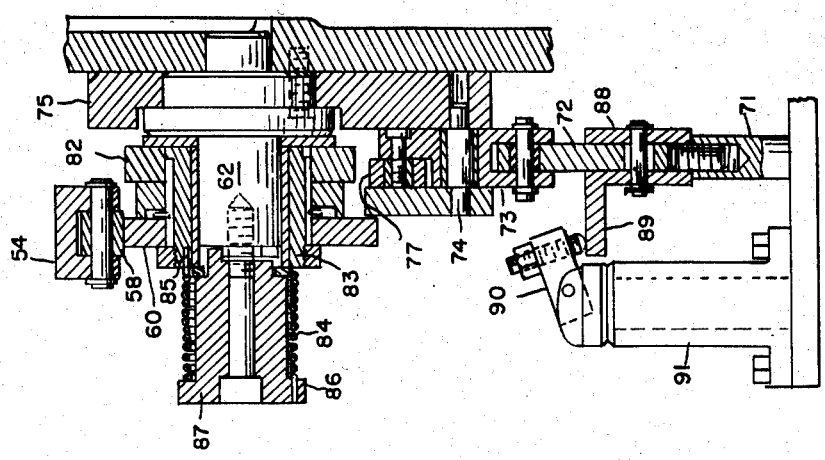
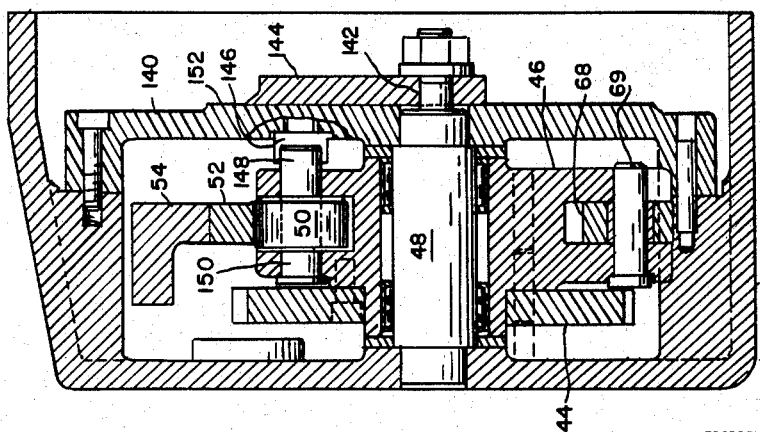
INVENTORS
WALTER S. PRAEG
ARTHUR B. BASSOFF
BY
ATTORNEYS

United States Patent Office 2,887,014
Patented May 19, 1959

2,887,014

GEAR FINISHING MACHINE

Walter S. Praeg and Arthur B. Bassoff, Detroit, Mich., assignors to National Broach & Machine Company, Detroit, Mich., a corporation of Michigan Application April 27, 1953, Serial No. 351,344

15 Claims. (Cl. 90—1.6)

The present invention relates to feed mechanism and more particularly to feed mechanism employed in a machine tool.

The present invention is a continuation-in-part of our prior copending application, Serial No. 308,390, filed September 8, 1952, now abandoned.

It is an object of the present invention to provide feed mechanism which is automatically operable to carry out a feeding cycle in a machine tool to effect successive movement between a work piece and tool from a clearance or loading position to an initial cut position, to successive increment feed positions, and finally to return the parts to clearance or loading position.

It is a further object of the present invention to provide mechanism for producing periodic incremental feed, followed by retraction from the final cut position to initial position, including an adjustable abutment to limit each incremental feed to a definitely predetermined amount.

It is a further object of the present invention to provide a machine tool which is fully automatic and which is adapted to carry out a cycle which includes relatively moving a cutter and work piece from a separated clearance or loading position to an accurately determined initial cut position, thereafter taking successive cuts and following each cut effecting a predetermined additional incremental infeed followed if desired by one or more idle strokes without infeed, following which the work piece and tool are relatively separated to loading or clearance position.

It is a feature of the present invention to provide loading mechanism characterized by the use of a reversible power unit, a movable feed member movable in opposite directions to accomplish relative infeed or outfeed between a work piece and a tool, an adjustable abutment limiting movement of the member when the power unit is actuated in outfeed direction to determine the position of the machine parts in loading or clearance position, a second movable abutment effective to limit movement of said member in infeeding direction when the power unit is actuated in infeed direction to determine first initial cut position between a work piece and tool, means for effecting movement of said second abutment to permit additional movement of said movable member to effect further infeed between the work piece and tool, reversal of said power unit effecting movement of said member in outfeed direction to a position as determined by engagement with said first abutment to reposition said member with the machine parts in separated clearance or loading position.

It is a further feature of the present invention to provide in apparatus of the character described in the preceding paragraph, cam means associated with the second abutment means, and means for periodically moving the cam to effect retraction of the second abutment means so as to permit additional movement of said feed member in infeed direction.

It is a further feature of the present invention to provide in apparatus as set forth in the preceding paragraph, resilient means tending to restore the cam to its initial cut position, means for moving the cam from initial cut successively to successive increment cut positions, engagement between the cam and said member being effective to retain the cam in adjusted position while said power unit is actuated in infeed direction, and resilient means effective to restore the cam to initial cut position when said power unit is actuated in outfeed direction.

Other objects and features of the invention will become apparent as the description proceeds, especially when taken in conjunction with the accompanying drawings, wherein:

Figure 1 is a front elevation of a gear finishing machine to which the present invention is applied.

Figure 2 is a fragmentary vertical section through the table and feed mechanism of the gear finishing machine.

Figure 3 is a front elevation with parts broken away of an automatic feed attachment adapted for use on the gear finishing machine shown in Figures 1 and 2.

Figure 5 is a fragmentary section on the line 5—5, Figure 3.

Figure 6 is a fragmentary section on the line 6—6, Figure 3.

Figure 4:
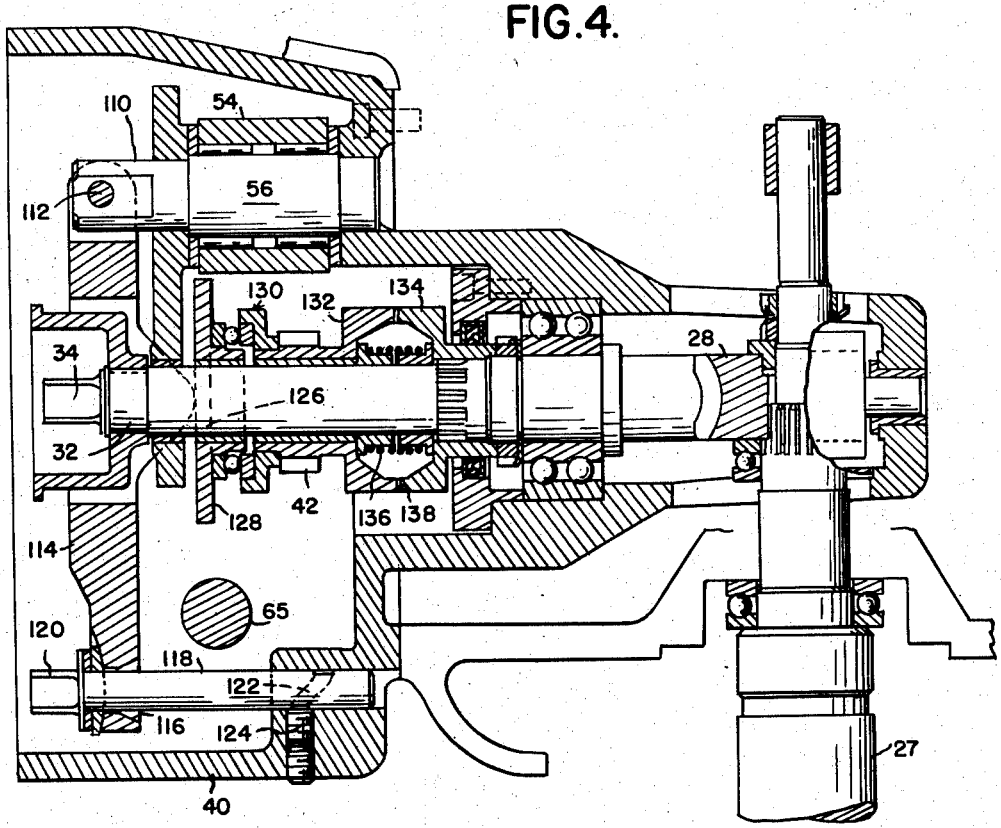
Figure 4 is a fragmentary section on the line 4—4, Figure 3.
Figure 7:
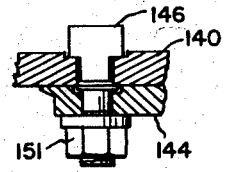
Figure 7 is a fragmentary section on the line 7—7, Figure 3.
Figure 8:
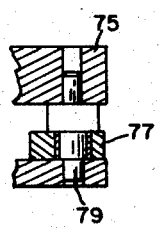
Figure 8 is a fragmentary sectional view on the line 8—8, Figure 3.
Figure 9:
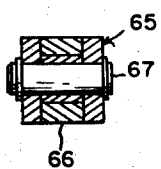
Figure 9 is a fragmentary sectional view on the line 9—9, Figure 3.

The present invention relates to feeding mechanism broadly and may be applied to any machine tool in which it is desired to carry out a cycle including successive feeding steps. For purposes of illustration however, the invention is illustrated as applied to a gear finishing machine, and more specifically, as an attachment for use on a gear finishing machine.

Referring now to Figures 1 and 2 there is shown a gear finishing machine which comprises a main frame 10 having an overhanging head 12 provided with an adjustable cutter head 14. At the front of the machine there is a vertically adjustable knee 16, a suitable feed screw device indicated generally at 18 being provided for effecting vertical movement of the knee. The gear finishing machine includes a slideway 22 on which is mounted a horizontal table 24 for horizontal reciprocation. The table includes head and tailstocks 26 between which a rotary work piece such for example as a gear is mounted.

As best seen in Figure 2, the feed screw mechanism includes a feed screw 27 which is rotatable by suitable mechanism for effecting vertical adjustment of the knee 16. Secured to the upper end of the vertical feed screw 27 is a worm gear 28 which meshes with a worm 30 carried by a shaft 32 terminating at the front of the machine in a square end, as indicated at 34, for rotation by a suitable hand tool. The present invention comprises mechanism adapted to be associated with the shaft 32 in such a way as to effect automatic controlled rotation thereto to effect vertical movement of the knee to carry out a complete finishing cycle. This cycle involves a vertically upward movement of the knee from a clearance or loading position in which a gear carried by the stocks 26 may be in loose mesh with a gear-like cutter carried by the cutter head 14. This vertical movement may be substantial and is intended to bring the gear and cutter into tight mesh or to establish an initial cut position. Thereafter, the table 24 is traversed to effect a cut, after which there will be provided one or more additional incremental rotations of the feed screw 27 to carry out successive cuts. Following this there may be one or more strokes of traverse of the table 24 without additional infeed, these being idle strokes or finishing strokes to complete the gear finishing operation. Finally, the feed screw will be reversely rotated to lower the knee 16 to its clearance or loading position.

The mechanism for carrying out these functions is illustrated in its entirety in Figure 3, although details of the mechanism will be more apparent from sectional views 4—9. The mechanism comprises a housing 40, the dimensions of which relative to the machine are best illustrated in Figure 2. The outer squared end 34 of the worm shaft 32 extends into this housing, and secured to the worm shaft 32 is a pinion 42. Carried by the housing 40 is a gear 44 which meshes with the pinion 42 and which is secured to an oscillating block or plate 46 mounted for rotary movement about a pivot member 48 best seen in Figure 5. Secured to the plate or block 46 is a roller 50 which is adapted to engage an abutment surface of a wear plate 52 secured to a lever 54 which is mounted intermediate its ends on a pivot member 56. At its opposite end the lever 54 carries a roller 58 which engages an adjustable stepped cam 60 mounted for rotation about a pivot member 62.

A power unit in the form of an air cylinder 64 is provided including a piston therein and a piston rod 65 connected by a link 66 and pivot pins 67 and 68 to the oscillating plate 46. Actuation of the air cylinder 64 in the direction to move the piston to the left, as seen in Figure 3, tends to rock the plate 46 clockwise thereby rotating gear 44 and hence small gear or pinion 42 which is keyed or otherwise secured directly to the worm shaft 32. The amount which this mechanism can rotate the pinion 42 is determined by engagement between the roller 50 of the plate 46 and the wear plate 52 of the lever 54 and this results in a movement of the machine parts to a position referred to herein as initial cut position, when the cam 60 is positioned such that the roller 58 of the lever 54 engages the outer surface thereof and not one of the successively reduced steps thereon, as illustrated in Figure 3.

Also included within the housing 40 is an index or increment feed air cylinder 70 having a piston therein and provided with a piston rod 71 connected by a lever 72 to a second link 73 pivoted at 74 to an oscillator plate 75 mounted for rotation on pivot member 62.

A pawl lever 77 carrying pawl 78 is pivoted to oscillator plate 75 at 79, and has an elongated slot 80 in which is received pin 81 carried by lever 73. Pawl 78 cooperates with index plate 82.

Both the index plate 82 and cam 60 are carried by a support 83 rotatable on pivot member 62 as best seen in Figure 6. A spring 84 has one end 85 fixed in said support 83, and its other end 86 fixed in spring mount 87. The spring 84 biases support 83, index plate 82 and cam 60 in a clockwise direction, as seen in Figure 3.

A yoke 88 (see Figure 6) having a toe 89 is carried by the piston rod 71, and engages the operating arm 90 of a valve 91 which enters into the control of the air cylinders 64 and 70.

Although air may be admitted continuously to cylinder 64 during successive cutting strokes, as disclosed in our prior application, it is preferred to admit air only when an infeed adjustment is made.

In operation, air is admitted to index cylinder 70 and its piston rod 71 moves upwardly. At this time there is no air pressure in the main cylinder 64, but the knee is stationary since its feed train locks the mechanism in place except when the worm shaft 32 is turned. The oscillator plate 75 offers more resistance to movement than lever 73, so initial upward movement of the piston rod rocks lever 73 counterclockwise as seen in Figure 3, and this moves pin 81 in the slot 80, rocking pawl lever 77 counterclockwise and engaging pawl 78 with the ratchet or index plate 82. Slot 88 is suitably inclined to the path of movement of pin 81 to accomplish this result. When the pawl is fully engaged, pivot 74, pin 81, and the axis of pivot member 62 are aligned, and the parts are all locked together. Further upward movement of the piston rod 71 rocks oscillator plate 75, levers 73 and 77, and pawl 78 about the axis of the pivot member 62, thereby rotating the ratchet or index plate 82 and cam 60 counterclockwise as seen in Figure 3. This positions a lower step of the cam 60 beneath roller 58 so that upon the next feed step, the cam will arrest lever 54 after predetermined movement to in turn provide a new position for wear plate 52, thereby limiting rotation of the plate 46 and gear 44, and hence gear 42.

Near the end of the stroke toe 89 actuates valve 91, admitting air into the main cylinder 64. Piston rod 66 is moved to the left as seen in Figure 5, rocking plate 46 and gear 44 clockwise, and raising the knee through the action of gear 42, shaft 32, worm 30, worm gear 28 and feed screw 27. Rocking of plate 46 rocks lever 54 through engagement of roller 50 and wear plate 52, and rocking of the lever 54 is arrested by engagement between roller 58 and the particular cam section of cam 60 which has been moved into position by the index cylinder 70 and associated mechanism.

Since the upward feeding of the knee is accomplished through a worm and worm gear combination, the mechanism remains in locked position when air pressure is cut off from the main cylinder 64, and the roller 58 remains in contact with cam 60, thus preventing clockwise rotation of the cam and ratchet plate 82 under the influence of the spring 84. It will be noted that each cam segment of the cam 60 includes a shoulder at its end which engages the roller 58 to prevent rotation of the cam when air is exhausted from cylinder 64, even though lever 54 may not maintain pressure on roller 58. Air pressure is reversed in the index cylinder 70 by suitable means (not shown) such as a time delay relay, and the index piston rod moves downwardly. Valve 91 operates to cut off air to the main cylinder and allowing the air therein to escape. Lever 73 swings about its pivot 74, rocking pawl lever 77 to retract the pawl 78 from ratchet wheel 82, and when the pin 81 reaches the upper end of slot 80, the oscillator plate 75 rocks clockwise about pivot member 62.

Air is supplied to cylinders 64 and 70 through a manifold 83 and exhaust is through a muffler 84.

Oscillator plate 75 has two outwardly projecting arms 93 and 94 carrying abutment screws 93a and 94a respectively which engage abutment surfaces on a block 95 to limit rocking of said oscillator plate 75 in both directions. The ratchet plate 82 carries a stop arm 96 engageable with adjustable screw 97 to limit clockwise movement of the ratchet plate and hence to determine the initial position of the cam 60 when the knee is lowered by reversing the air pressure in main cylinder 64.

The periphery of the cam 60 may be provided with a plurality of sets of successively lower seats, so that a single cam may be used for different cycles. Each of the seats includes an arcuate concave shoulder 85a and a convex cylindrical portion 85b. The spring 84 is connected so as to establish a relatively strong force tending to rotate the cam 60 in a clockwise direction as seen in Figure 3. Actuation of the air cylinder 70 comprises quick successive up and down strokes, to re-position the pawl 78 in position to effect further counterclockwise rotation of the cam upon the next actuation of the cylinder 70. As before stated, the cam and hence the index plate 82, is held against clockwise rotation by engagement between shoulder 85a and roller 58, so that during downstroke of the piston rod 71, the pawl 78 merely rides over one or more teeth of the ratchet as determined by the setting of the mechanism.

Suitable clutch means are provided by means of which final depth of cut may be adjusted. This means is best seen by reference to Figures 3 and 4 wherein it will be observed that the pivot mounting 56 includes an extension 110 apertured to receive a pivot pin 112 by means of which a clutch actuating lever 114 is mounted. At its lower end the lever 114 has an opening 116 therethrough receiving a quarter turn lock screw 118 having its outer end squared, as indicated at 120 for engagement with a tool and having a high angle cam slot 122 engaging a fixed pin 124 carried in the housing 40.

The lever 114 has a pair of projecting lugs 126 which bear against an annular member 128 mounted on the shaft 32 and adapted to transmit thrust through ball bearings 130 to an outer clutch member 132 which is provided intermediate its ends with the teeth constituting the pinion or small gear 42 previously referred to, which outer clutch member 132 is freely rotatable on shaft 32. Keyed or otherwise secured to the shaft 32 is an inner clutch member 134 and intermediate the clutch members is a compression spring 136 which urges the clutch members 132 and 134 apart or toward clutch release position. The adjacent faces of the clutch members 132 and 134 are serrated as indicated at 138 and the serrations may be as fine as required to produce the most delicate instrument.

When a gear has been finished by the machine and is removed and tested and found to be slightly oversize or undersize, a fine adjustment may be made by releasing the clutch, effecting rotation of the shaft 32 by a wrench applied to the squared portion 34 of the shaft 32, after which the clutch may again be tightened up. This adjustment does not affect the cycling including the amount of metal which is removed at each stage of the operation, but it adjusts the final finish size of the gears to that required.

Mounted on a plate 140 for rotation about a reduced portion 142 of the pivot member 48 is a backlash adjusting sector 144. The sector 144 is provided with a T-bolt 146 which extends inwardly from the sector 144 through an arcuate slot 147 in plate 140 into the path of a projecting end portion 148 of a pin 150 which supports the roller 50. The sector 144 may be adjusted to determine the location of the machine parts at clearance or idle position. The T-bolt 146 is provided with a nut 151 which clamps the sector 144 in adjusted position. Preferably, the plate 140 is provided with a graduated scale 152 which cooperates with an index mark on the sector 144 to permit accurate setting of the machine.

The machine is particularly well adapted for shaving a series of gears and for this purpose the steps necessary to set the machine up for further operation will be briefly reviewed. In the first place an unfinished gear is loaded between the centers of the stocks 26 and the clutch is then disengaged by rotating the shaft 118. Thereafter, by applying a hand tool to the squared end 34 of the worm gear 32 the knee is fed upwardly and the gear is finished to the desired final dimensions, using a hand feed between successive strokes of traverse. The proper sequence cam 60 is provided on rotary support 62. Thereafter the index plate is rotated by suitable mechanism to bring the "finished depth" portion of the selected cam surface in proper position to register with the roller 58 on the lever 54. This may be accomplished by manual rotation of the cam 60 or if desired, a push button control may be provided for effecting repeated actuation of the increment feed air cylinder 70. The main air cylinder 64 is now energized which will rotate the plate 46 and cause roller 50 to engage the wear plate 52 of the lever 54 to rock the lever and bring the other roller 58 into engagement with the "finished depth" section of the cam. At this time the clutch actuating shaft 118 is rotated to lock up the clutch parts 132 and 134 and the machine is now in position corresponding to the final cut with all parts thereof in the proper position. However, so far no setting has been made to determine the backlash or clearance when the machine parts return to clearance or loading position. At this time then the depth of finished cut which may conveniently be marked on the several sections of the cam, is added to the clearance or backlash desired for the loading position. Thus for example, the sequence cam 60 may be effective to produce a total depth of cut of .012". If it is desired to provide .008" clearance in loading position, these two figures are added giving a total of .020", and the sector 144 is adjusted to bring the index mark thereon opposite the graduation .020 on the scale 152. Air is now reversed in the increment feed cylinder and the main air cylinder and the machine returns to the desired clearance or loading position.

If during the operation it becomes desirable to alter clearance this may be accomplished merely by re-adjustment of the sector 144 carrying the T-bolt 146 therewith. If during a sequence of gear shaving operations it becomes desirable to alter the final size of the sequence of gears being shaved, this may be accomplished simply by releasing clutch members 132 and 134 and effecting the desired adjustment by rotation of shaft 32 with a hand tool, after which the clutch is reengaged and the parts operate as before stated.

The feed mechanism disclosed herein may be coordinated with the particular cycle of the machine tool. Thus for example, in the present case a gear shaving machine has been chosen for purpose of illustration. In this machine the gear shaving operation comprises a plurality of back and forth reciprocations of the table 24, each of which may be considered as constituting a cutting stroke. The feeding cycle may be determined by the design of the cam 60 so as to provide any desired number of back and forth reciprocations plus incremental infeed at the end of each cutting stroke if desired, followed by one or more idle strokes if desired. Assume that the cutting cycle is to comprise three reciprocations, the first two of which are to be followed by infeeding, and a fourth idle stroke which is not preceded by infeed. In this case a cam will be selected having a pair of consecutively depressed cam portions, the second or innermost of which has a circumferential extent sufficient to permit indexing of the cam without changing the operating diameter. The cam will initially be adjusted so that the roller 58 rests upon the outer periphery of the cam adjacent the first depressed cam surface. At this time air is admitted to the main cylinder 64 by a valve controlled by a starting switch and the knee will be fed upwardly until its upward motion is arrested by its engagement between the roller 58 and the periphery of the cam and by engagement of the roller 50 and the wear plate 52. This determines the initial cut position. It will be apparent that the upward movement of the knee in this instance may be relatively great, since the lower or retracted position of the knee is determined only by engagement between the pin 148 and the head of the T-bolt 146. The machine enters upon its automatic cycling during which the gear and gear-like cutter are rotated in mesh and the table 24 traverses from one limiting position to the other. When it reaches the first limiting position suitable means, such for example as a switch, operates a valve to admit air to the index cylinder 70 and, as previously indicated, air pressure remains on the cylinder 70 for a predetermined interval controlled by suitable conventional time-delay mechanism. Upward movement of the piston in the cylinder 70 effects index rotation of the cam and as index rotation of the cam is completed the valve 91 is operated to admit air to the main cylinder 64. When the time-delay has passed the air supplied to the index cylinder is reversed and its piston moved downwardly, at the same time cutting off and exhausting air from the cylinder 64. This operation is repeated at the next succeeding stroke with a consequent shifting of the cam to bring the second depressed cam portion beneath the roller 58. Upon completion of the third traverse stroke the cam will again be indexed but in the assumed cycle the portion of the cam thus moved to position beneath the roller 58 will have the same position as the portion previously engaged by the roller 58. Accordingly, there will be no further infeed and the fourth stroke in the cycle will be an idle stroke or finishing stroke. The machine, as well understood, may include controls to terminate the cycle after four strokes by suitable timing mechanism which will operate to reverse the air supplied to the main cylinder 64 thereby dropping the knee and swinging plate 46 counterclockwise, thereby permitting counterclockwise movement of the lever 54. Spring 84 will return the cam 60 to its initial position.

It will be appreciated that the foregoing described feed control is entirely automatic and thus permits a machine tool equipped therewith to be also provided with automatic loading mechanism so that a supply of parts may be furnished to the machine automatically loaded, completely machined and unloaded, the machine returning to loading position for the next operation of automatic loading mechanism. Automatic loading mechanism suitable for use with a gear finishing machine equipped with automatic feed mechanism is disclosed in the application of Walter S. Praeg, Serial No. 20,504, filed April 12, 1948, Patent No. 2,692,535 granted October 26, 1954.

The drawings and the foregoing specification constitute a description of the improved gear finishing machine in such full, clear, concise and exact terms as to enable any person skilled in the art to practice the invention, the scope of which is indicated by the appended claims.

What we claim as our invention is:

1. Power feed mechanism comprising a cam for limiting infeed operation of said mechanism, pawl and ratchet means including a member movable in cam feeding and idle strokes for advancing said cam, means responsive to the cam feeding stroke of said member to energize said power feed mechanism in infeed direction, and responsive to the idle stroke thereof to de-energize said power feed mechanism.

2. In a machine tool, reversible power feed mechanism for effecting infeed and outfeed, movable rigid abutment means for limiting infeed by said mechanism, power means for adjusting said abutment means from an initial position to successive infeed positions, means for actuating said feed mechanism in infeed direction following successive adjustments of said abutment means, and means automatically operated after a predetermined number of infeed adjustments to reverse said feed mechanism and to restore said abutment means to initial position.

3. In a machine tool having a frame, a work support and a tool support on said frame, and means mounting one of said supports for forward and reverse movement in infeeding and outfeeding directions: feed control mechanism comprising a reversible motor, drive means connecting said motor and said one support including a movable member, an adjustable abutment on said frame engageable by said member to effect positive and accurate termination of an infeed stroke, means for effecting intermittent adjustment of said adjustable abutment during a machine cycle to provide for additional infeed, means operable to effect brief energization of said motor in infeeding direction after each adjustment of said abutment and then to de-energize said motor, a second abutment on said frame engageable by said member to limit outfeeding movement of said one support, and means operable at the end of a cutting cycle to reverse said motor to complete a machine cycle by effecting outfeeding movement of said one support to a loading position determined by engagement between said member and said second abutment.

4. In a machine tool having a frame, a work support and a tool support on said frame, and means mounting one of said supports for forward and reverse movement in infeeding and outfeeding directions: feed control mechanism comprising a reversible motor, drive means connecting said motor and said one support including a movable member, an adjustable abutment on said frame engageable by said member to effect positive and accurate termination of an infeed stroke, means for effecting intermittent adjustment of said adjustable abutment during a machine cycle to provide for additional infeed, the means for adjusting the adjustable abutment comprising a movable pawl and ratchet actuated thereby, means for locking said pawl in engagement with said ratchet during its movement in an adjustment stroke, means for briefly energizing said motor for a forward infeeding stroke and an idle return stroke between consecutive adjusting and return strokes of said pawl, a second abutment on said frame engageable by said member to limit outfeeding movement of said one support, said motor being reversible to complete a machine cycle by effecting outfeeding movement of said one support to a loading position determined by engagement between said member and said second abutment.

5. A gear finishing machine comprising a frame, a work support and a tool support on said frame, means for effecting relative traverse strokes between said supports, one of said supports being movable on said frame toward and away from the other support, feed mechanism connected between said frame and said one support, said feed mechanism comprising a rigid member movable in accordance with infeed or outfeed movement of said one support, a rigid abutment mounted for movement along the path of movement of said rigid member to be engaged thereby to provide accurate and positive termination of an infeed movement of said one support, means automatically operated in timed relation to traverse strokes of said machine to effect predetermined incremental adjustments of said abutment, reversible power means connected to said feed mechanism and operable following each adjustment of said abutment to operate said mechanism in an infeed direction to the extent permitted by said abutment, and means operated in response to completion of a predetermined number of traverse strokes to reverse said power means to move said one support in an outfeed stroke to a loading position.

6. A machine as defined in claim 5 comprising abutment means for limiting outfeed movement of said feed mechanism at a point at which said rigid member is spaced substantially from said rigid abutment.

7. A machine as defined in claim 5 in which said means to adjust said abutment comprises a stepped cam engageable therewith, said power means comprising a piston and cylinder motor connected between said frame and said rigid member, and means responsive to completion of an adjustment of said abutment to actuate said power means to effect an infeed movement of said one support to the amount permitted by the adjustment of said cam.

8. A gear finishing machine comprising a frame, a work support and a tool support on said frame, means for effecting relative traverse strokes between said supports, one of said supports being movable on said frame toward and away from the other support, feed mechanism connected between said frame and said one support, said feed mechanism comprising irreversible drive means and a rigid member movable in accordance with infeed or outfeed movement of said one support, a rigid abutment mounted for movement along the path of movement of said rigid member to be engaged thereby to provide accurate and positive termination of an infeed movement of said one support, means automatically operated in timed relation to traverse strokes of said machine to effect predetermined incremental adjustments of said abutment, reversible power means comprising a piston and cylinder motor connected to said feed mechanism and means operated automatically following each adjustment of said abutment to operate said mechanism for a brief interval in an infeed direction to the extent permitted by said abutment, and means operated in response to completion of a predetermined number of traverse strokes to reverse said power means to move said one support in an outfeed stroke to a loading position.

9. In a machine tool having a frame, a work support and a tool support on said frame, means providing for forward and reverse movement of one of said supports in infeeding and outfeeding directions: feed control mechanism comprising reversible motor means, drive means connecting said motor means and said one support including a movable member, an adjustable abutment on said frame engageable by said member to effect accurate and positive termination of an infeed stroke, a rotary stepped cam for adjusting said abutment during a machine cycle to provide for additional infeed, a pawl and ratchet mechanism for rotating said cam step-by-step during a machine cycle in a direction to provide for increased depth of feed, resilient means continuously urging said cam in the opposite direction, and a stop means engageable by said cam when it is reversely rotated by said resilient means at the end of a cycle.

10. In a machine tool having a frame, a work support and a tool support on said frame, means providing for forward and reverse movement of one of said supports in infeeding and outfeeding directions: feed control mechanism comprising reversible motor means, drive means connecting said motor means and said one support including a movable member, an adjustable abutment on said frame engageable by said member to effect accurate and positive termination of an infeed stroke, a rotary stepped cam for adjusting said abutment during a machine cycle to provide for additional feed, said motor means being continuously operated to maintain pressure against said rotary cam to prevent reverse rotation thereof during a machine cycle, power means for effecting intermittent angular adjustment of said cam during a machine cycle, resilient means continuously urging said rotary cam in the opposite direction, said resilient means being effective when said motor means is de-energized to restore said rotary cam to its initial position.

11. In a machine tool having a frame, a work support and a tool support on said frame, means providing for forward and reverse movement of one of said supports in infeeding and outfeeding directions: feed control mechanism comprising reversible motor means, drive means connecting said motor means and said one support including a movable member, an adjustable abutment on said frame engageable by said member to effect accurate and positive termination of an infeed stroke, power means operated automatically during a machine cycle for adjusting said abutment to provide for additional infeed, clutch means in said drive means, and manually operable means for effecting adjustment of said one support when said clutch means is disengaged to provide fine adjustment of the depth of feed.

12. In a machine tool having a frame, a work support and a tool support on said frame, means providing for forward and reverse movement of one of said supports in infeeding and outfeeding directions: feed control mechanism comprising reversible motor means, drive means including feed screw mechanism connecting said motor means and said one support including a movable member, an adjustable abutment on said frame engageable by said member to effect accurate and positive termination of an infeed stroke, a rotary cam engaged by said abutment for adjusting said abutment, and power means automatically operated to adjust said cam during a machine cycle to provide for additional infeed.

13. In a machine tool having a frame, a work support and a tool support on said frame, means providing for forward and reverse movement of one of said supports in infeeding and outfeeding directions: feed control mechanism comprising reversible motor means, drive means including feed screw mechanism connecting said motor means and said one support including a movable member, an adjustable abutment on said frame engageable by said member to effect accurate and positive termination of an infeed stroke, a rotary stepped cam for adjusting said abutment during a machine cycle to provide for additional infeed, resilient means urging said cam in reverse direction, and stop means for limiting reverse rotation of said cam by said resilient means at the end of a cycle.

14. In a machine tool having a frame, a work support and a tool support on said frame, and means mounting one of said supports for forward and reverse movement in infeeding and outfeeding directions: feed control mechanism comprising a reversible motor, drive means connecting said motor and said one support including a movable member, an adjustable abutment on said frame engageable by said member to effect positive and accurate termination of an infeeding stroke, means for adjusting said abutment during a machine cycle to provide for additional infeed, a second abutment on said frame engageable by said member to limit outfeeding movement of said one support, said motor being reversible to complete a machine cycle by effecting outfeeding movement of said one support to a loading position determined by engagement between said member and said second abutment.

15. Apparatus as defined in claim 14 in which said motor is continuously energized in forward or infeeding direction during a cutting portion of the cycle, and the means for adjusting said adjustable abutment is intermittently operated.

References Cited in the file of this patent

UNITED STATES PATENTS

| | | |
|---|---|---|
| 291,745 | Kubec | Jan. 8, 1884 |
| 1,126,084 | Reisbach | Jan. 26, 1915 |
| 2,380,261 | Praeg | July 10, 1945 |
| 2,565,883 | Praeg et al. | Aug. 28, 1951 |

FOREIGN PATENTS

| | | |
|---|---|---|
| 344,856 | Great Britain | Mar. 10, 1931 |